US006865218B1

(12) United States Patent
Sourour

(10) Patent No.: US 6,865,218 B1
(45) Date of Patent: Mar. 8, 2005

(54) MULTIPATH INTERFERENCE REDUCTION FOR A CDMA SYSTEM

(75) Inventor: Essam A Sourour, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 687 days.

(21) Appl. No.: 09/723,152

(22) Filed: Nov. 27, 2000

(51) Int. Cl.[7] .............................................. H04B 1/707
(52) U.S. Cl. ...................................... 375/148; 370/342
(58) Field of Search ................................. 375/144, 147, 375/148, 346, 347, 349, 142; 370/320, 335, 342, 441; 455/65

(56) References Cited

U.S. PATENT DOCUMENTS

| 6,034,986 | A | * | 3/2000 | Yellin ........................... 375/148 |
| 6,067,292 | A | | 5/2000 | Huang et al. |
| 6,233,272 | B1 | * | 5/2001 | Yugawa ....................... 375/148 |
| 6,570,909 | B1 | * | 5/2003 | Kansakoski et al. ........ 375/148 |

OTHER PUBLICATIONS

Ta–Sung Lee et al., "A Partially Adaptive CDMA Interference Canceller for Multipath Channels," 2000 IEEE, VTC 2000, pp. 917–920.

Quee Seng et al.; "Performance of Blind Adaptive Receiver with Decision Directed Steering Vector," 1999 IEEE, pp. 1246–1250.

Ann–Louise Johansson et al.; "A Hybrid Interference Cancellation Scheme for Multiuser Systems in Multipath Fading Channels," European Transactions on Telecommunications, Eurel Publication, vol. 11, No. 2, pp. 207–217.

* cited by examiner

*Primary Examiner*—Betsy L. Deppe
(74) *Attorney, Agent, or Firm*—Coats & Bennett, P.L.L.C.

(57) ABSTRACT

A method and system reduce multipath signal interference in a CDMA receiver. The CDMA receiver including parallel first and second RAKE receivers receives a multipath signal. The first RAKE receiver includes a number of individual RAKE fingers, each operating with a defined finger delay matched to a propagation path delay. The output signal from each RAKE finger includes multipath interference. The second RAKE receiver includes a group of RAKE fingers corresponding to each RAKE finger in the first RAKE receiver. Each group of RAKE fingers is configured to produce an estimate of the multipath interference in the output signal generated by the corresponding RAKE finger in the first RAKE receiver. The estimated multipath interference signals are scaled, and then subtracted from the RAKE finger outputs from the first RAKE receiver to reduce multipath interference. Scaling coefficients are adjusted to ensure that such subtraction effectively reduces multipath interference.

18 Claims, 11 Drawing Sheets

MULTIPATH INTERFERENCE REDUCTION FOR A CDMA SYSTEM

BACKGROUND OF THE INVENTION

The present invention relates generally to Code Division Multiple Access (CDMA) systems and, more particularly, to reducing multipath interference in a received CDMA signal.

Different types of wireless communication systems have adopted various schemes for supporting as many simultaneous users as possible. Code Division Multiple Access (CDMA) is one such scheme. CDMA is a technique employed in spread spectrum communications systems that allows multiple users to simultaneously share the same frequency. In CDMA systems, a wideband spreading signal is used to convert a narrowband data signal into a wideband signal for transmission. Direct sequence spread spectrum systems use a pseudo noise (PN) sequence to spread the data signal into a wideband signal.

Modulation of the PN sequence by the data sequence may be achieved by, for example, applying the data sequence and the PN sequence to a product modulator or multiplier. Multiplication of two signals produces a resultant signal whose frequency spectrum is equal to the convolution of the frequency spectrum of the two signals being multiplied. Thus, multiplying the wideband PN sequence signal with the relatively narrowband data signal produces a wideband signal whose spectrum is nearly equal to the spectrum of the PN signal.

CDMA permits multiple users to simultaneously use the same frequency by assigning to each user a different PN code selected from a set of orthogonal codes. Transmissions to and from individual users are spread using their assigned PN codes. Thus, an individual user's signal may be recovered using his or her assigned spreading code from the combined CDMA signal. With orthogonal spreading codes, the cross-correlation between different signals spread using different codes is nominally zero. Thus, correlating a received CDMA signal, which contains signals for all active users sharing that frequency, with a given user's PN code results in recovery of the narrowband data signal spread with that user's PN code. Data signals intended for the other active users are not de-spread by correlation, and appear as wideband noise.

In CDMA systems using orthogonal codes and relatively long spreading code sequences with respect to transmitted data symbol timing, receivers can exploit these favorable code cross-correlation properties to increase receiver performance. Improvements in performance may be had even in the presence of unfavorable reception conditions, such as in multipath environments. Multipath reception commonly occurs in mobile terminals where numerous and changing obstructions intervene between the transmitter and the mobile terminals. In these cases, the transmitted CDMA signal travels to a given mobile terminal through a number of different propagation paths, with each path having different path characteristics, such as path length, phase, and attenuation.

RAKE receivers are frequently used in CDMA systems, and can exploit multipath reception in many circumstances to improve reception performance. RAKE receivers accomplish this by separately processing a selected number of the multipath versions of the CDMA signal received by the mobile receiver, and then coherently combining the data signals recovered from the selected multipath signals to form an overall RAKE receiver output signal with an improved signal-to-noise plus interference ratio (SNIR). RAKE receivers conventionally comprise some number of RAKE "fingers." Each RAKE finger is adapted to correlate the received CDMA signal with a commonly assigned PN code. Each RAKE finger is time-adjusted to align it with a different one of the multipath versions of the CDMA signal received by the mobile receiver.

The time-alignment essentially "shifts" each RAKE finger in correspondence with a relative propagation path delay for one of the selected propagation paths. Propagation paths are generally selected based on signal strength, and a typical RAKE receiver includes only a limited number of RAKE fingers, which in operation are aligned with the most significant multipath signals. The individual RAKE finger outputs are typically weighted based on the propagation path characteristics of the corresponding multipath channels, and then coherently combined to form the overall RAKE receiver output signal. Conventional RAKE receiver techniques generally work best in environments where the total number of simultaneous users occupying the same frequency is not too great. As the number of simultaneous users increases, the amount of interference arising from the multipath signals influencing each other increases.

BRIEF SUMMARY OF THE INVENTION

The present invention comprises a method and system for improving receiver performance under multipath reception conditions in CDMA-based mobile communication systems. A base station transmits a CDMA forward link signal that is received by one or more mobile terminals. Typically, an individual mobile terminal receives the transmitted signal through a number of propagation paths, giving rise to multipath interference in the received CDMA signal. The mobile terminal includes a modified RAKE receiver that reduces multipath interference in the received CDMA signal.

The modified RAKE receiver comprises a primary RAKE function and interference estimation RAKE function. The primary RAKE includes one or more primary RAKE fingers, with each primary RAKE finger time aligned in accordance with a propagation path delay associated with a propagation path through which the received CDMA signal is received. The primary RAKE fingers each recover the user's signal of interest by correlating the received CDMA signal with the user's assigned PN code sequence at a time offset corresponding to the finger's respective propagation path. The output signals from the primary RAKE fingers are coherently combined to form a combined signal of interest.

The interference estimation RAKE function generates multipath interference estimates for each of the signals output by the primary RAKE fingers. After scaling and combining, all the path interference estimates are subtracted from the combined signal of interest to reduce multipath interference in the combined signal of interest. The particular order of combining and subtracting signals of interest and interference estimates may be adjusted in accordance with design needs. Generally, there are L primary RAKE fingers, each aligned to one of the L most significant propagation paths—those paths with the strongest signal. Each one of the primary RAKE fingers has a corresponding L−1 interference estimators within the interference estimation RAKE function, for a total of L*(L−1) interference estimators. The ratio between primary RAKE fingers and interference estimators may be changed in accordance with design requirements.

Each interference estimator corresponds to a respective one of the primary RAKE fingers, in turn each one of the primary RAKE fingers is time aligned with a respective one of the propagation paths associated with the received CDMA signal. Thus, each interference estimator estimates the multipath interference in the signal of interest recovered by its respective primary RAKE finger arising from a remaining one of the multipath propagation paths. In general, each interference estimator comprises L−1 secondary RAKE fingers, but this ratio may be adapted as needed. Each secondary RAKE finger generates a multipath interference estimate by correlating the received CDMA signal at a time offset determined by path delay differences between the propagation path associated with its respective primary RAKE finger and a remaining one of the propagation paths associated with the received CDMA signal. Nominally, for L primary RAKE fingers there are L (L−1) interference estimators, and (L−1) secondary RAKE fingers within each interference estimator.

The multipath interference estimates generated by the interference estimators can be coherently combined and subtracted from a combined output taken from the primary RAKE fingers. Alternative combining and subtraction schemes include but are not limited to subtracting relevant interference estimates on a per primary RAKE finger basis, and then combining the interference-compensated primary RAKE finger signals to form a combined output signal of interest. In any case, the multipath interference estimates produce by the interference estimation RAKE are subtracted from the combined signal of interest produced by the primary RAKE to reduce multipath interference. The modified RAKE receiver determines appropriate scaling for the interference estimate produced by each second RAKE finger to insure that its subtraction from the combined signal of interest results in an actual reduction of interference in the combined signal of interest.

Multipath interference reduction techniques employed by the modified RAKE receiver do not require knowledge of the number of simultaneous users, nor do the techniques require knowledge of any PN codes being used for the other users operating on the same frequency. Further, because multipath interference estimation in the modified RAKE receiver is based on channel estimates that are readily updateable based on the pilot channel included in the CDMA forward link signal, estimation is responsive enough to deal with fast fading conditions.

DETAILED DESCRIPTION OF THE INVENTION

Figure 1:
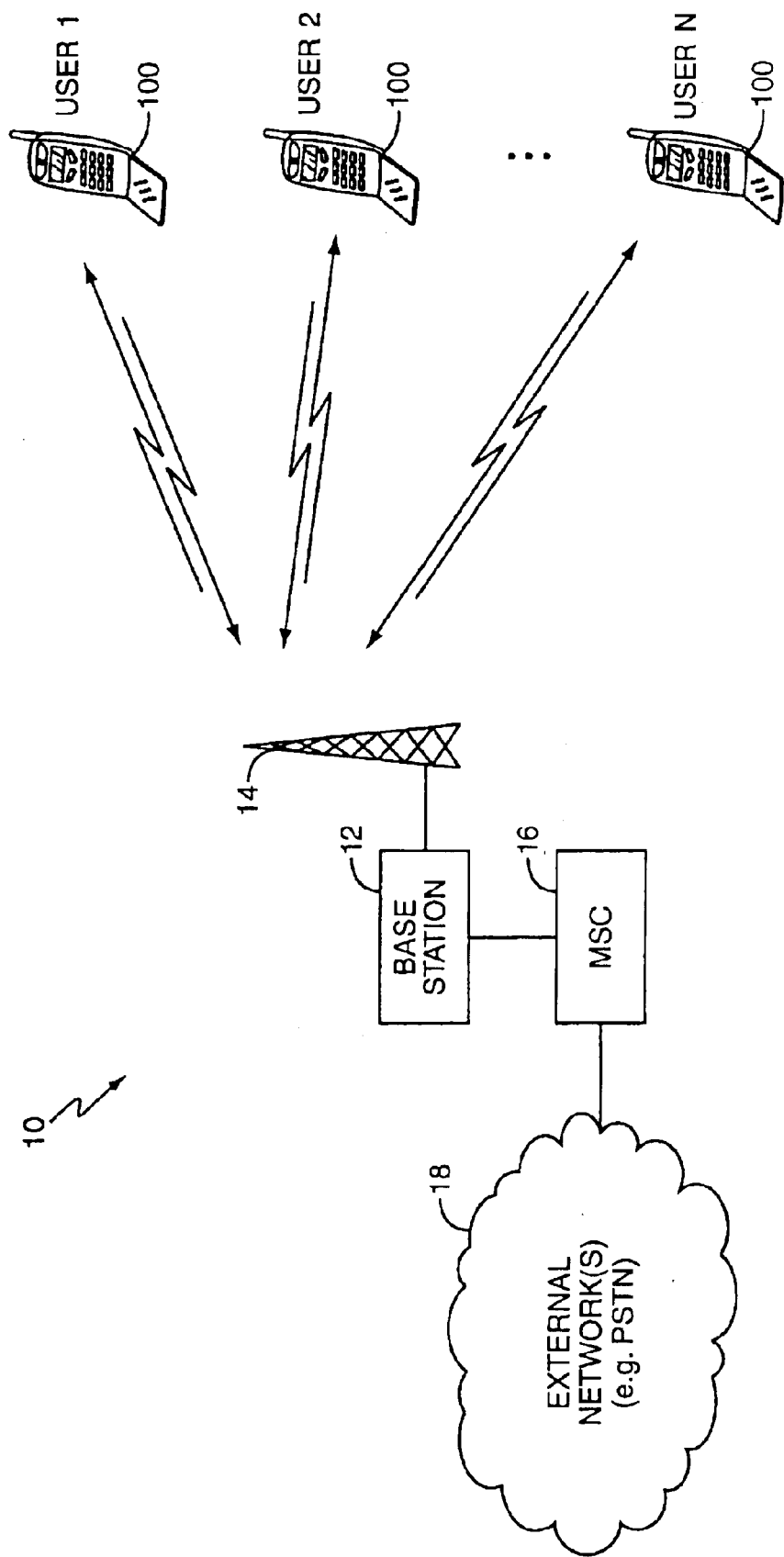
FIG. 1 is a diagram of an exemplary wireless communications network in which the present invention may be advantageously employed.

Referring now to FIG. 1, the present invention will be discussed in the context of a wireless communications network supporting over-the-air communications between mobile terminals 100 and stationary receivers generally known as base stations. For simplicity, the wireless communications network is depicted with only one base station 12 and associated antenna 14; however, a practical wireless communications network will include multiple base stations 12 to provide communications service to an extended area. The base station 12 connects to a mobile switching center (MSC) 16 that connects with one or more external networks 18, such as the Public Switched Telephone Network (PSTN), the Integrated Services Digital Network (ISDN), and/or the Internet. The base station 12 is located in and provides wireless communication services to a geographic region referred to as a cell. Generally, there is one base station 12 for each cell within a given wireless communications network. The wireless communications network can support communications between individual users of the mobile terminals 100, and between users of the mobile terminals 100 and other communication systems accessible through the external networks 18.

The present invention contemplates communications between the mobile terminals 100 and the base station 12 based on direct sequence spread spectrum signaling employing CDMA techniques. Interim Standard 95 (IS-95) represents an example of CDMA-based signaling. IS-95 defines a wireless communications standard widely employed in North America, and in other parts of the world. While IS-95 represents an existing cellular communications standard, related, newer standards are under development by the Telecommunications Industry Association (TIA), as well as by other standards bodies and industry organizations. For example, Interim Standard 2000 known as "cdma2000", represents the next generation CDMA standard currently being developed in the United States. The European variant of this standard is referred to as Wideband CDMA (WCDMA), and is also under current development. These named standards represent only a few of the many relevant communications standards. It should be understood that the present invention could be adapted and employed in a variety of communications systems extending well beyond the CDMA-based applications discussed herein.

Figure 2:
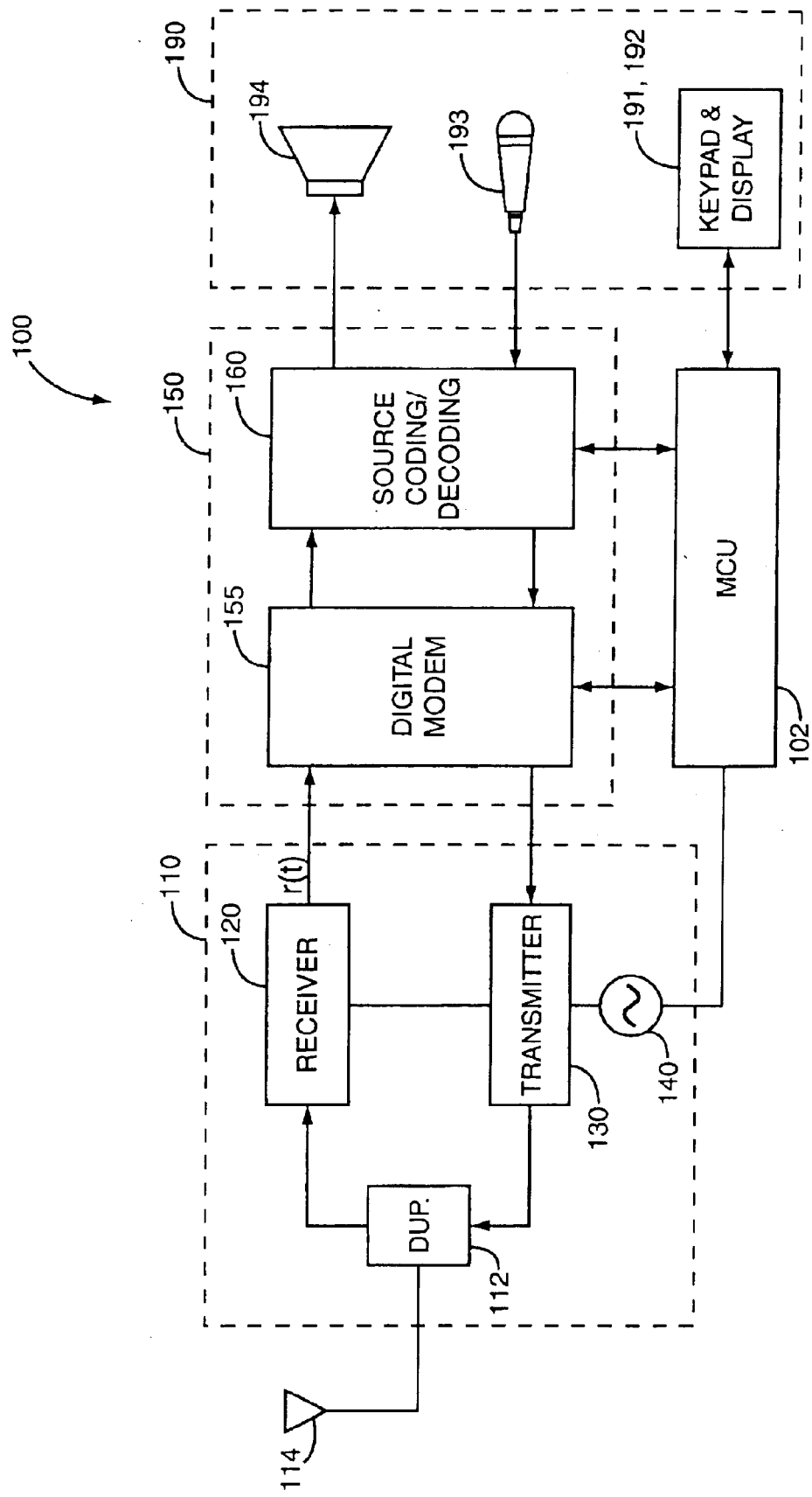
FIG. 2 is a functional diagram of a mobile terminal implementing the modified RAKE receiver of the present invention for use in the wireless communications network of FIG. 1.

FIG. 2 is a block diagram of a mobile terminal 100. The term "mobile terminal" as used herein includes a cellular radiotelephone; a Personal Communications System (PCS) terminal that may combine a cellular radiotelephone with data processing, facsimile and data communications capabilities; a Personal Digital Assistant (PDA) that can include a radiotelephone, pager, Internet/Intranet access, web browser, organizer, calendar; a conventional lap top and/or palm top computer equipped with a radiotelephone transceiver, or other appliance that includes a radiotelephone transceiver. Mobile terminals may also be referred to as "pervasive computing" devices. The specific architecture of the mobile terminal 100 will vary depending upon the terminal's range of features and specific intended use.

The mobile terminal 100 comprises a micro controller unit (MCU) 102, an RF transceiver 110, a digital signal processor (DSP) 150, and a user interface 190. The mobile terminal 100 may additionally include an external interface (not shown) for communication with the computer, local area network, or other device.

The RF transceiver 110 establishes a link between the mobile terminal 100 and the antenna 14 for wireless communications with the base station 12. The RF transceiver 110 comprises a receiver 120, a transmitter 130, a frequency synthesizer 140, an antenna coupling circuit 112, and an antenna 114. The receiver 120 and transmitter 130 are coupled to the antenna by the antenna coupling circuit 112. The antenna coupling circuit 112 may include a duplexer for isolating transmit and receive signal paths during full duplex receive and transmit operations, and may include a switch for multiplexing the antenna between the receiver 120 and transmitter 130 during half-duplex receive and transmit operations. Transmit-band and receiver-band filters in the duplexer provide the necessary isolation between receive and transmit signal paths in the RF transceiver 110.

The receiver 120 receives a downlink or a forward link communications signal from the base station 12. Within a given cell, a number of mobile terminals 100 receive the same forward link CDMA signal from a common base station 12. In a given mobile terminal 100, the receiver 120 receives the CDMA forward link signal, amplifies and down converts the received signal to a base band frequency of the DSP 150. Signals converted by the receiver 120 to the base band frequency are referred to herein as base band signals. Thus, the receiver 120 provides the DSP 150 with a base band received CDMA signal r(t). The transmitter 130 sends an up link or reverse link communications signal to the base station 12. The transmitter 130 receives base band signals from the DSP 150, which the transmitter 130 amplifies and uses to modulate an RF carrier at a directed power level.

The frequency synthesizer 140 provides reference signals used for frequency translation in the receiver 120 and the transmitter 130.

The DSP 150 comprises a source coder/decoder 160 and a digital modem 155. A speech coder is included within the source coder/decoder 160 for digitizing and coding speech for transmission on the reverse link to the base station 12. Additionally, the speech coder decodes speech signals received from the base station 12 and converts speech signals into audio signals that are output to the speaker 194.

The digital modem 155 processes digital signals to make communications between the mobile terminal and the base station 12 more robust. The digital modem includes a digital modulator 170 (FIG. 4) and a demodulator 180 (FIG. 5).

The MCU 102 supervises the operation of the mobile terminal and administers the procedures associated with the communication protocol being used. The MCU 102 typically comprises a microprocessor and supporting peripherals facilitating control of the mobile terminal. Peripherals typically include timer/counter units, pulse-width modulation (PWM) generators, bit-directed input/output, serial communications interfaces, and other modules for flexibly interfacing the microprocessor with various other circuitry within the mobile terminal. The microprocessor may include hardware computational units for accelerating certain mathematical operations, such as division and squaring.

Typically, the MCU 102 assigns timers to track network time and uses that information to assist in synchronizing the mobile terminal 100 with the required transmit and receive signal timing. The timing information may be used to identify frame boundaries and slot indexes associated with the received CDMA signal. The MCU 102 also uses timers to trigger specific tasks as the mobile terminal 100 transitions to different operating modes, such as sleep, receive, and talk. The MCU 102 uses register files to store calibration data, the electronic serial number (ESN) of the user (used to authenticate the user), and to other non-volatile information.

The MCU 102 also implements the communication protocols used by the mobile terminal 100. The communication protocol specifies timing, multiple access approach, modulation format, frame structure, power level, as well as many other aspects of mobile terminal operation. The MCU 102 inserts signaling messages into the transmitted signals sent to the base station 12 and extracts signaling messages from the received signals. The MCU 102 acts on signaling messages received from the base station 12 as set forth in the communication protocol. When the user enters commands via the user interface 190, the commands are passed to the MCU 102 for action. The MCU 102 also provides power management to the mobile terminal 100. Power management includes monitoring battery energy levels, charging the battery, and minimizing power consumption by changing modes. In general, there are three modes of operation for the mobile terminal 100: idle, receive, and talk. In idle mode, the MCU 102 deactivates most functions except the digital system clock. In receive mode the MCU 102 activates the receiver 120 and the digital modem 155. It further demodulates the paging channel in the received CDMA signal until it receives a valid paging message and then switches to talk mode. In talk mode, the entire mobile terminal 100 is activated to support two-way communication.

The MCU 102 and DSP 150 use dedicated or shared buses to connect to memory (not shown). Memory is typically segmented into blocks that hold the start-up code, control software, DSP firmware, and temporary data.

Figure 3:
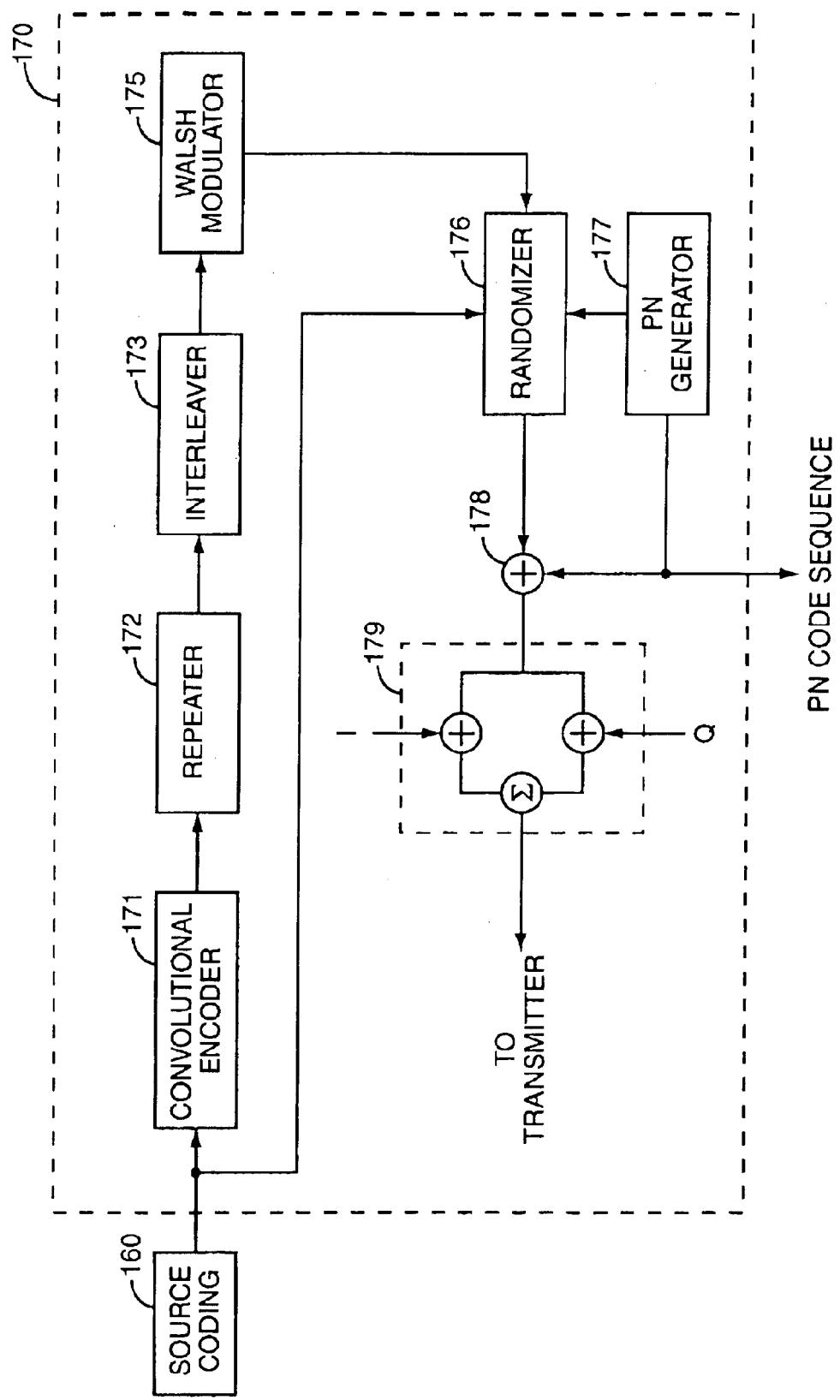
FIG. 3 is a functional diagram illustrating the processing performed by the digital modulator in the mobile terminal of FIG. 2.

FIG. 3 is a functional block diagram illustrating the processing performed by the digital modulator 170 in a CDMA mobile terminal 100. The digital modulator 170 comprises a convolutional encoder 171, a repeater 172, a block interleaver 173, a Walsh code generator 175, a randomizer 176, a pseudo noise generator 177, an adder 178 and an IQ modulator 179. An information source, such as the user interface 190, provides an information signal, such as speech or facsimile signals to the source coder/decoder 160, which converts the information signal into digital form. The output of the source coder/decoder 160 is applied to an error correction coder to render transmissions more tolerant to noise and interference. The error correction encoder, may, for example, comprise the convolutional encoder 171. The error correction coder adds controlled redundancy to the source encoded bits to aid in the detection and correction of errors that occur during transmission. Detailed discussion of the processing performed by the digital modulator 170, including operation of the Walsh modulator 175, the randomizer 176, and the PN generator 177, is not critical to understanding the present invention. However, the PN generator 177 may provide the assigned PN sequence to other functions within the mobile terminal 100.

Figure 4:
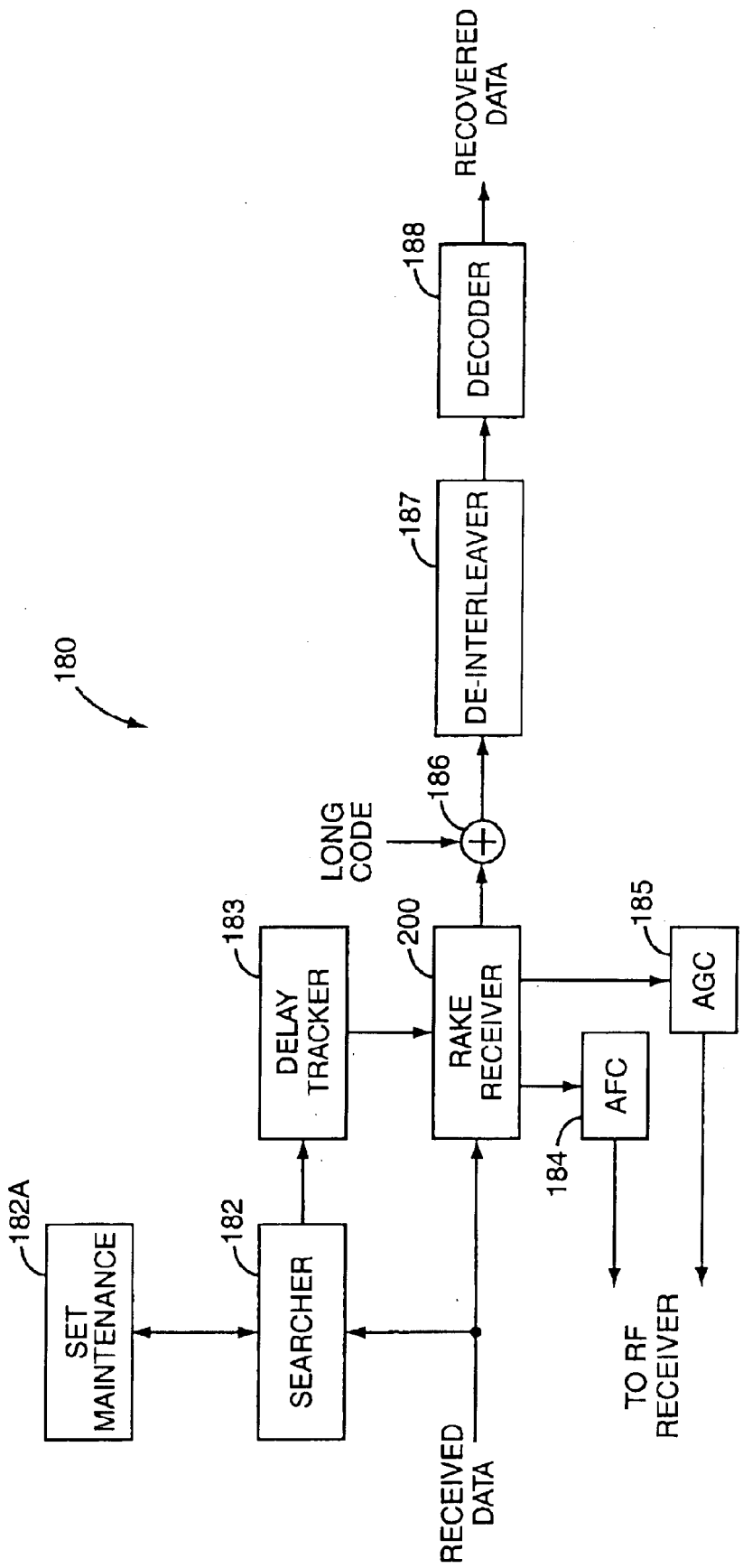
FIG. 4 is a functional diagram illustrating the processing performed by the digital demodulator in the mobile terminal of FIG. 2.
Figure 5:
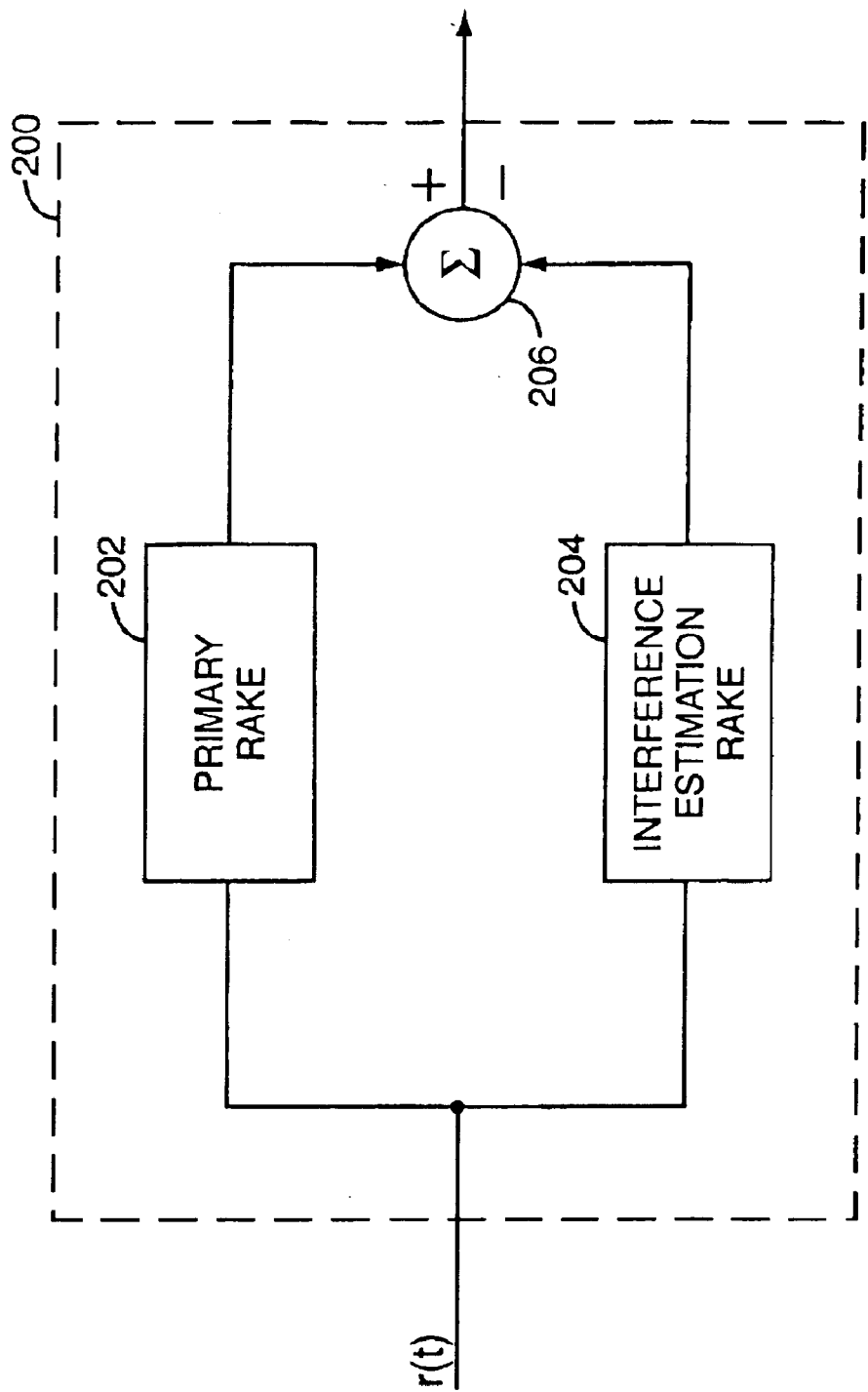
FIG. 5 is a functional diagram illustrating the modified RAKE receiver in the mobile terminal of FIG. 2.

FIG. 4 is a block diagram showing the digital demodulator 180 for a CDMA mobile terminal 100. The digital demodulator 180 comprises a searcher 182 and associated set maintenance list 182A, a delay tracker 183, a rake receiver 200 according to the present invention, an automatic frequency control function (AFC) 184, an automatic gain control function (AGC) 185, a summing circuit 186, a de-interleaver 187, and a decoder 188.

The searcher 182 identifies the significant propagation path signals from the active base station 12 based on pilot channel information included in the received CDMA signal. The pilot channel has known characteristics and allows the searcher to make rough determinations for the relative delay offsets $\{\tau\}$ of each of the identified propagation paths. Because the pilot channel is a known signal, the propagation path characteristics for each of the propagation paths may be estimated, including path gain and phase characteristics. The propagation path delay information determined by the searcher 182 is provided to the delay tracker 183, which further refines the delay estimates $\{\tau\}$ such that the PN code sequence used by the RAKE receiver 200 may be synchronized with the propagation paths of interest.

The delay tracker 183 also includes tracking hardware that allows the mobile terminal to keep its RAKE receiver 200 aligned with the propagation paths' potentially changing path delays. The searcher 182 also provides information regarding the set maintenance list 182A, which includes stored lists of active, neighboring, and remaining base stations 12 relevant to the current geographic position of the mobile terminal 100. As will be explained in more detail, the RAKE receiver 200 correlates the received CDMA signal r(t) with the user's assigned PN code and Walsh code to recover the signal of interest (the user's intended data signal) from the received CDMA signal r(t). The recovered signal of interest still includes interleaving and error coding and must therefore pass through the de-interleaver 187 and the decoder 188 before the actual data signal is recovered.

The digital demodulator 180 provides two signals that are used to track the strength and carrier frequency of the received CDMA signal. The automatic gain control (AGC) loop adjusts the gain of the receiver 120 to overcome fading effects of the propagation channel. The automatic frequency control (AFC) loop corrects the RF synthesizer 140 to obtain the proper base band frequency after down conversion by the receiver 120.

FIG. 5 provides top level illustration of the RAKE receiver 200 contemplated by the present invention. The RAKE receiver 200 may be thought of as two halves, with the primary RAKE 202 operative to recover the signal of interest from the received CDMA signal r(t), and the interference estimation RAKE 204 operative to generate interference estimates arising from multi-path reception of the received CDMA signal. In general operation, the interference estimates produced by the interference estimation RAKE 204 are subtracted from the combined signal of interest output by the primary RAKE 202 using a summing circuit 206 to reduce multi-path interference in the combined signal of interest.

Figure 6:
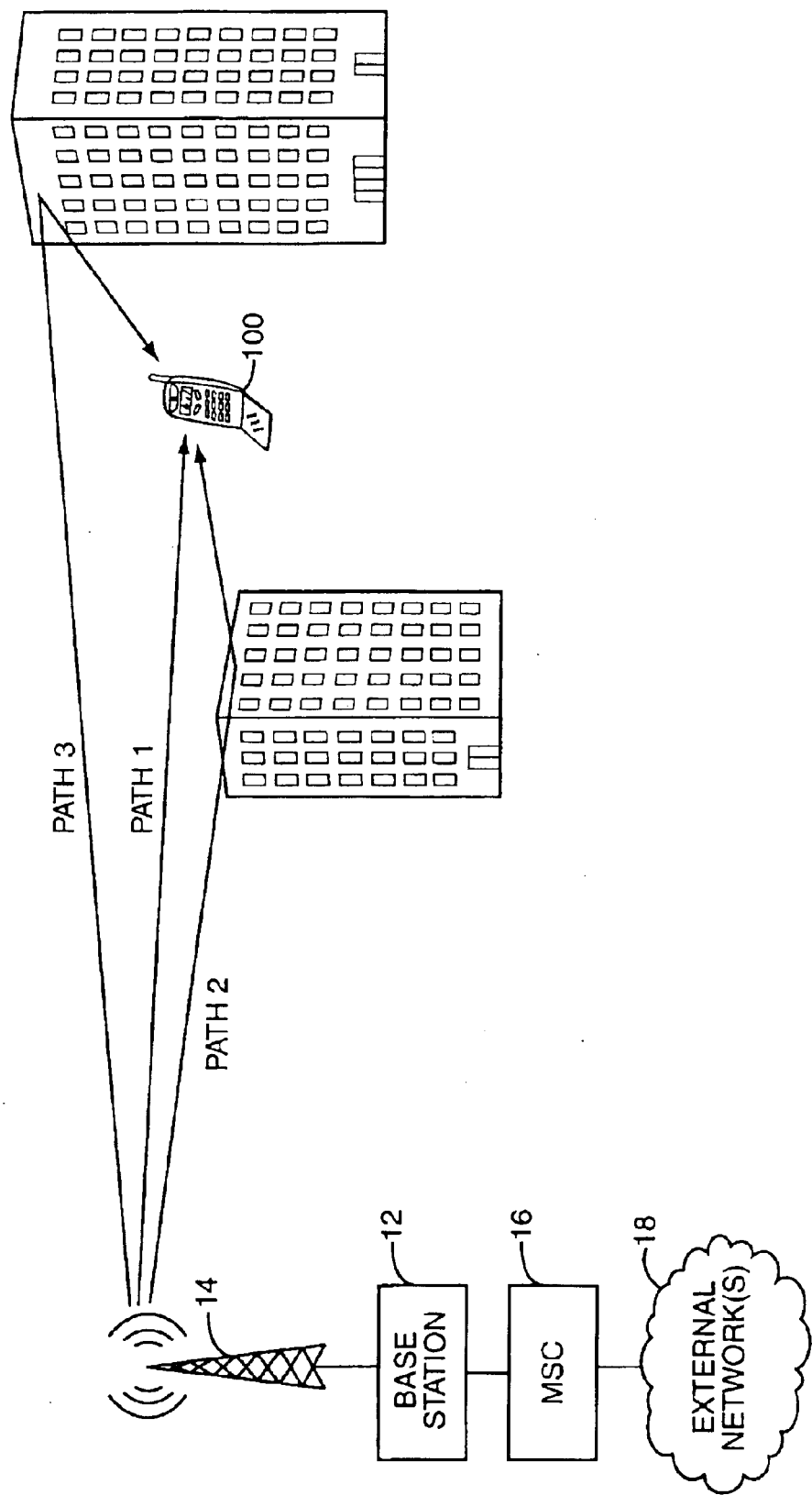
FIG. 6 is a diagram illustrating the mobile terminal of FIG. 2 subjected to multipath reception.

FIG. 6 illustrates the problem of multipath reception in a mobile communications environment. The mobile terminal 100 is subjected to multi-path reception arising from various obstacles in and around its reception and environment. More particularly, the radio signal transmitted by the antenna 14 associated with the base station 12 travels through a number of different propagation paths depending upon the environmental surroundings relevant to the fixed position of the base station 12 and the variable position of the mobile terminal 100. Obstacles commonly include buildings and geographic features, as well as other types of structures and obstructions. The radio signals transmitted from the base station antenna 14 may have a direct, line-of-site path to the mobile terminal 100, but will usually also travel to the mobile terminal 100 via alternate propagation paths induced by the radio signal reflecting from various obstructions.

In the example illustrated, the mobile terminal 100 receives the signal transmitted by the antenna 14 through three propagation paths, path 1, path 2, and path 3. Thus, the received CDMA signal r(t) operated on by the RAKE receiver 200 includes multipath components associated with path 1, path 2, and path 3. The received CDMA signal r(t) may be considered a composite of its various multipath signal components. Each propagation path has particular characteristics regarding radio signal attenuation, phase change, and mobile terminal arrival time. The multi-path components of the received CDMA signal have different arrival times due to the different path lengths of the various propagation paths. While the illustration depicts three radio signal propagation paths, in practice the mobile terminal 100 may receive the transmitted signal through any number of propagation paths. Typically, only a select number of these propagation paths will be significant in terms of signal strength from the perspective of the mobile terminal 100.

Figure 7:
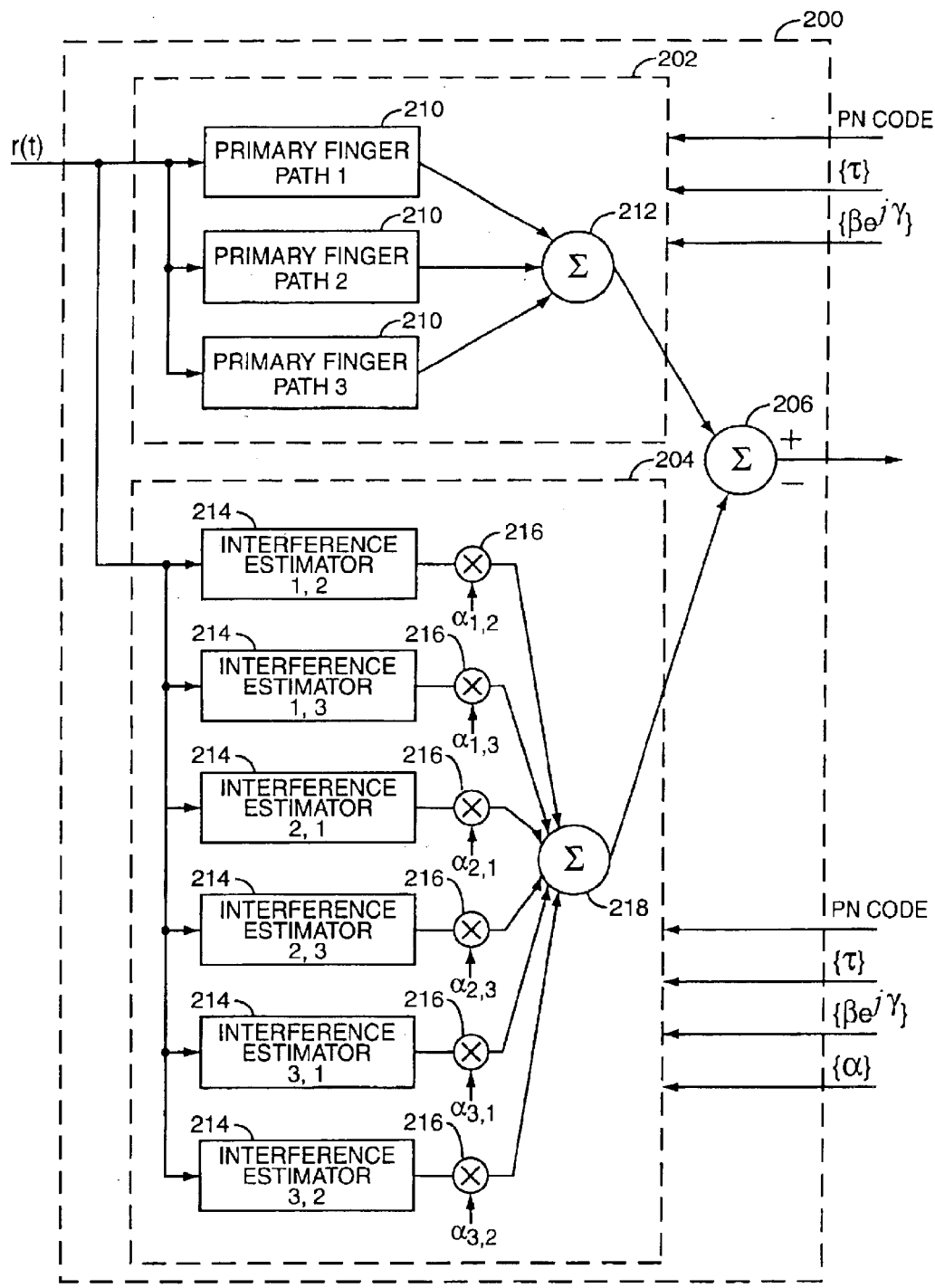
FIG. 7 is a functional diagram illustrating exemplary details of the modified RAKE receiver of FIG. 5 when the number of channel paths L=3.
Figure 7A:
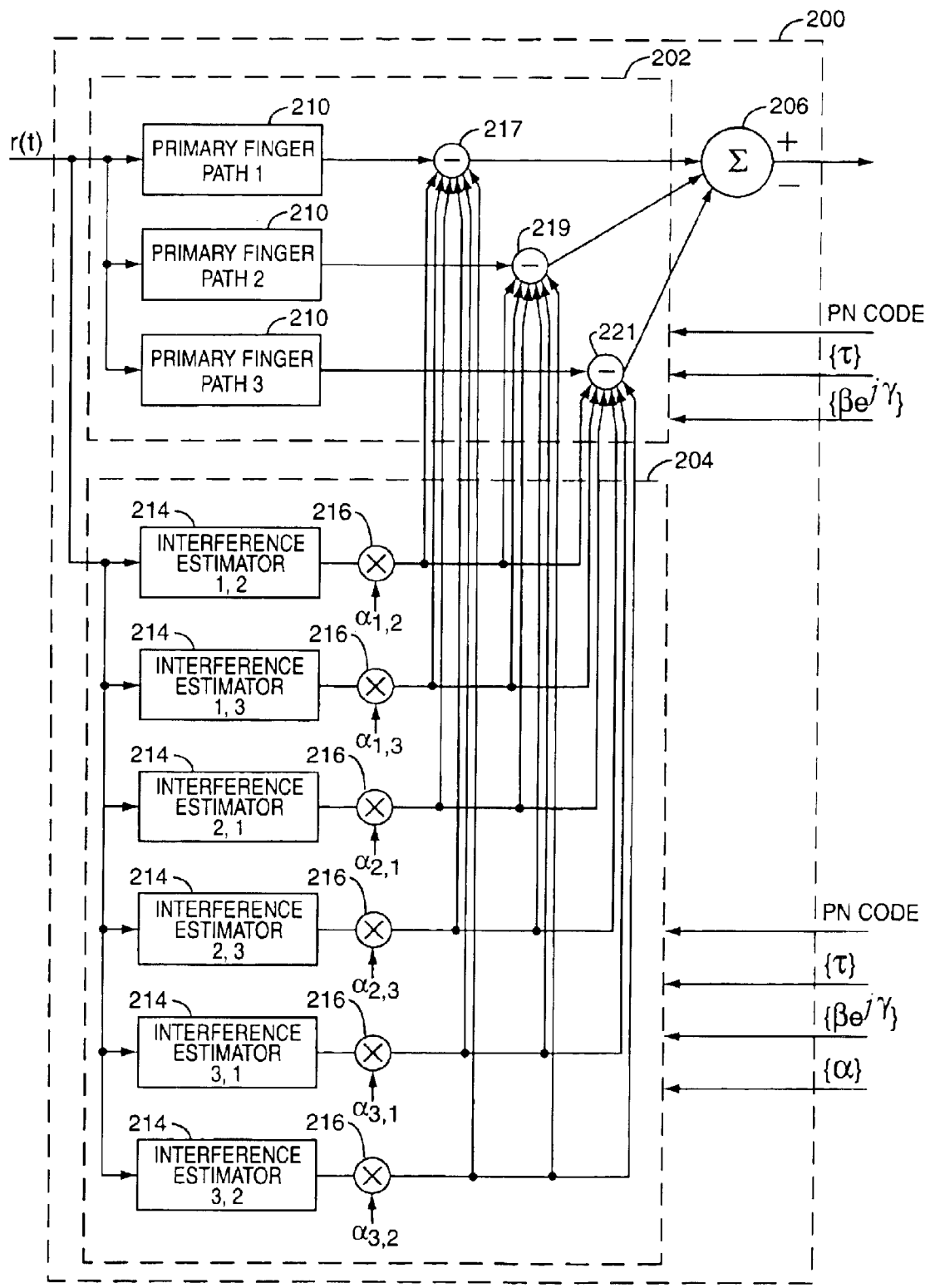
FIG. 7a depicts another embodiment of the modified rake receiver.

FIG. 7 provides details for one embodiment of the modified RAKE receiver 200 introduced in FIG. 5. The primary RAKE 202 includes one or more primary RAKE fingers 210 and an associated summing circuit 212. The interference estimation RAKE 204 includes one or more interference estimators 214, along with a corresponding number of scaling multipliers 216, and a summing circuit 218. As illustrated, the RAKE receiver 200 of the present invention is configured to accommodate three propagation paths (paths 1, 2, and 3). It should be understood that the RAKE receiver 200 may be configured for any desired number of propagation paths.

In general, to accommodate L propagation paths, the primary RAKE 202 will include L primary fingers 210, while the interference estimation RAKE 204 will include $L*(L-1)$ interference estimators 214. However, the basic formula for determining the number of interference estimators 214 needed in proportion to the number of primary RAKE fingers 210 may be changed or altered as needed, or as design restraints require. For example, hardware constraints may require that the total number of interference estimators 214 be reduced. In such cases, the interference estimation RAKE 204 would be scaled back to estimate interference for only a selected number of the primary RAKE fingers 210.

In operation the primary RAKE 202 is configured such that each one of the primary RAKE fingers 210 is assigned to one of the propagation paths of interest. Each primary RAKE finger 210 correlates the received CDMA signal at a time offset corresponding to a path delay associated with the assigned propagation path of that primary RAKE finger 210. Each primary RAKE finger 210 may be time-aligned in a number of ways. For example, the primary RAKE fingers 210 might share delay elements (not shown) such that the received CDMA signal r(t) could be appropriately delayed or time offset by values corresponding to the various propagation path delays of interest, and then these time adjusted versions of the received CDMA signal r(t) could be provided to the corresponding primary RAKE fingers 210. Alternatively, the PN code and Walsh code sequences supplied to each of the primary RAKE fingers 210 and used in their correlation operations can be offset by an amount corresponding to the propagation path delay associated with the particular primary RAKE finger 210. Offsetting the PN code and Walsh code sequences in this manner is often times referred to as "code phase offsetting." By offsetting the PN code and Walsh code sequences, it may be more practical to include delay elements within each of the primary RAKE fingers 210.

Figure 8:
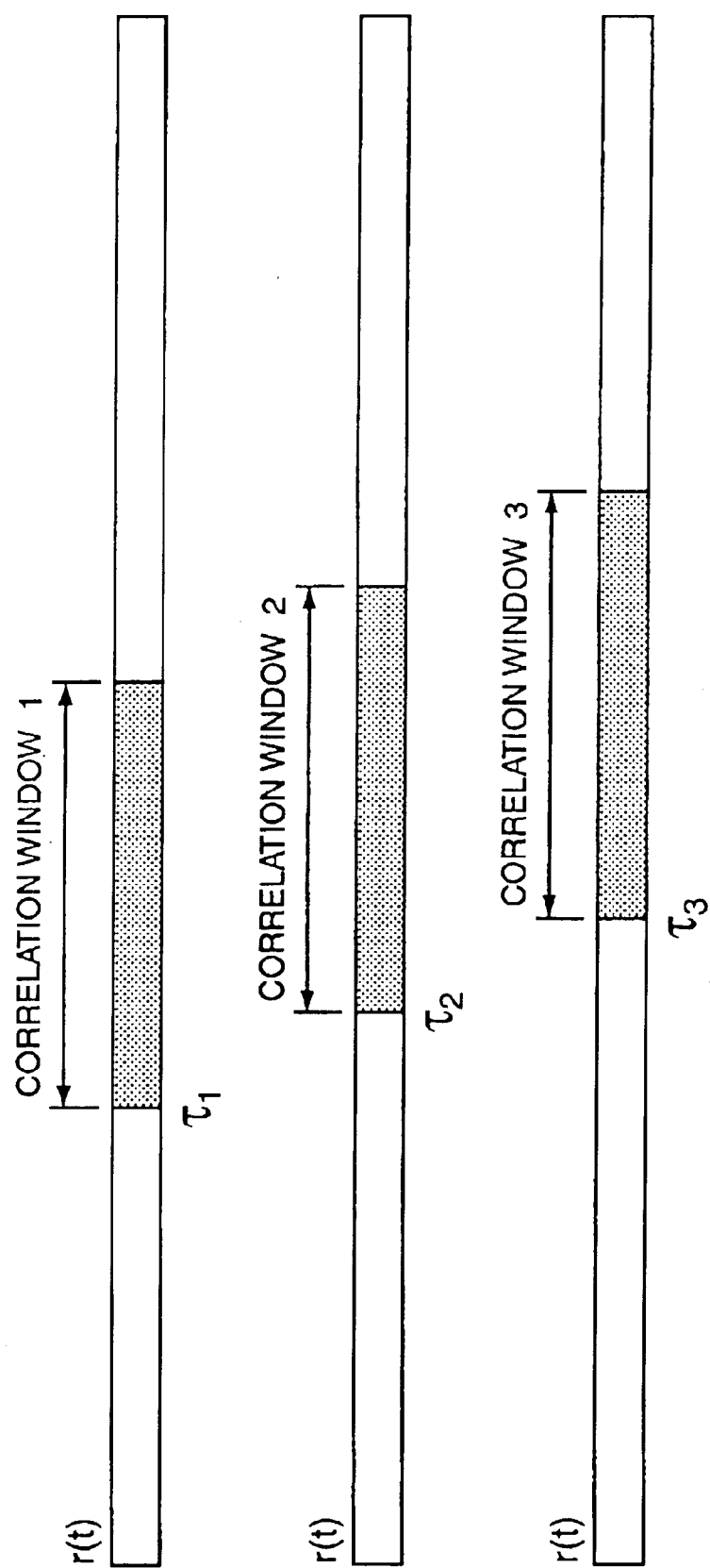
FIG. 8 is a diagram illustrating time offset components in the received composite signal operated on by the modified RAKE receiver arising from multipath reception, with L=3.

FIG. 8 illustrates the effect of time shifting the PN code sequence in the three primary RAKE fingers 210. The received CDMA signal r(t) is correlated by the first primary RAKE finger 210 over a correlation window at time offset $\tau_1$ corresponding to path 1. The second and third primary RAKE fingers 210 correlate the same received CDMA signal r(t) at relative time offsets $\tau_2$ and $\tau_3$, corresponding to paths 2 and 3, respectively. The received CDMA signal r(t) represents a composite of the multi-path components arising from receiving the transmitted signal through the various propagation paths.

Referring again to FIG. 7, the RAKE receiver 200 receives the currently assigned PN code sequence, the set of propagation path relative delay values $\{\tau\}$, the set of propagation path channel coefficients $\{\beta e^{j\gamma}\}$, and a set of interference estimate scale factors ($\alpha$). The values for $\{\tau\}$ and $\{\beta e^{j\gamma}\}$ may, for example, be provided by the delay tracker 183. The PN code sequence and the assigned Walsh code in IS-95 systems may, for example, be provided by the digital modulator 170. The primary RAKE 202 uses the relative delay values $\{\tau\}$ to align each primary RAKE finger 210 in accordance with the propagation path delays. In the three-path example, the set of relative delay values $\{\tau\}$ comprises $\tau_1$, $\tau_2$, and $\tau_3$ noted above. The set of channel coefficients $\{\beta e^{j\gamma}\}$ comprises channel coefficients $\beta_1 e^{j\gamma}{}_1$, $\beta_2 e^{j\gamma}{}_2$, and $\beta_3 e^{j\gamma}{}_3$, corresponding to propagation paths 1, 2, and 3, respectively. The P values represent a magnitude value corresponding to path gain, while the y values represent propagation path phase shifts. Both the primary RAKE 202 and the interference estimation RAKE 204 use the set of delay values ($\tau$) and the set of channel coefficients $\{\beta e^{j\gamma}\}$.

Additionally, the interference estimation RAKE 204 receives a set of scale values ($\alpha$) representing multipath interference estimate signal scaling factors that are explained in more detail later. In the three-path example, the set of scaling factors $\{\alpha\}$ comprises $\alpha_{1,2}$, $\alpha_{1,3}$, $\alpha_{2,1}$, $\alpha_{2,3}$, $\alpha_{3,1}$, and $\alpha_{3,2}$, corresponding to scaling factors for each propagation path with respect to the remaining propagation paths.

FIG. 7 depicts another embodiment of the modified RAKE receiver 200. According to this embodiment, the scaled multipath interference estimates from scaling multipliers 216 are subtracted on a per primary RAKE finger basis by differencing circuits 217, 219, 221. The multipath interference-compensated primary RAKE finger signals are then combined by summing circuit 206 to form a combined output signal of interest.

Figure 9:
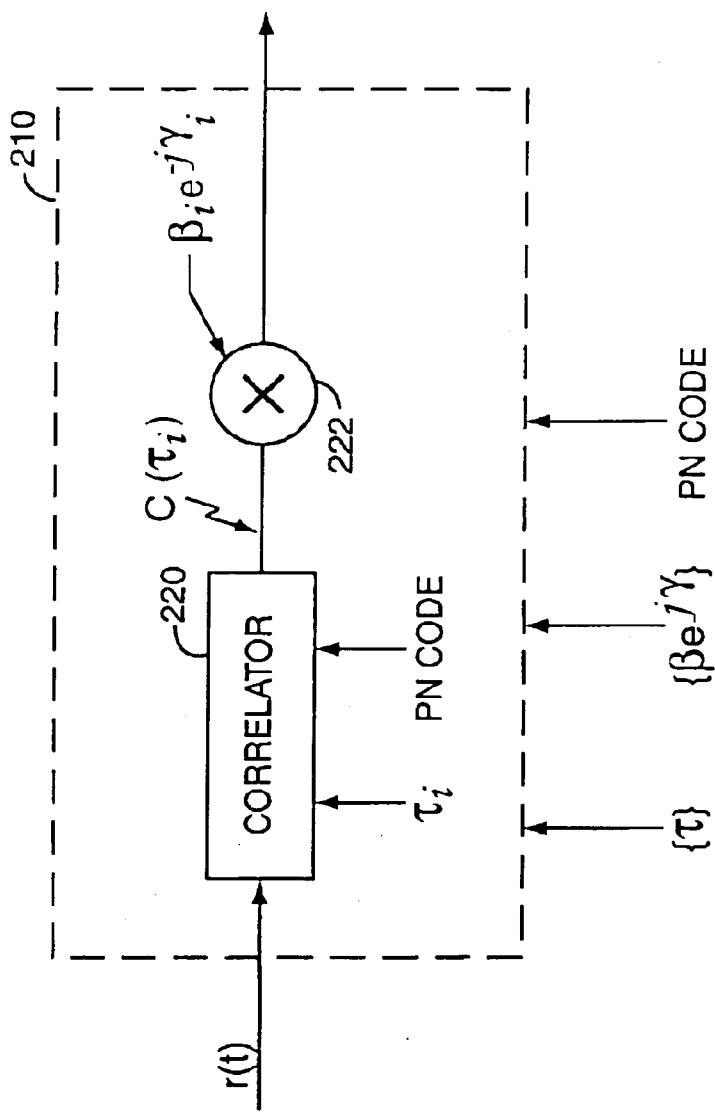
FIG. 9 is a functional diagram illustrating exemplary details of a primary RAKE finger used in the modified RAKE receiver of FIG. 5.

FIG. 9 illustrates a primary RAKE finger 210. The primary RAKE finger 210 includes a correlator 220 for correlating the received CDMA signal r(t) with the PN code sequence at offset $\tau_i$ and a multiplier 222 for multiplying the received CDMA signal r(t) by the appropriate channel coefficient $\beta_i e^{j\gamma}{}_i$, where the subscript i denotes the particular propagation path to which the primary RAKE finger 210 is aligned. As noted, the primary RAKE finger 210 may be time aligned to a specific one of the propagation paths by either delaying the received CDMA signal or delaying the PN code sequence. Thus, the correlator can use the appropriate one in the set of path delay values $\{\tau\}$ to offset the PN code sequence and Walsh code by an amount related to the path delay of the corresponding propagation path. The output from the multiplier 222 is termed the "signal of interest" and includes multipath interference arising from the other propagation paths that becomes increasingly worse as the number of simultaneous users of nearby mobile terminals 100 increases.

Each of the primary RAKE fingers 210 multiplies its correlator output signal by the complex conjugate of the corresponding channel coefficient $\beta_i e^{j\gamma}{}_i$ so that the signals of interest output by each primary RAKE finger 210 may be coherently combined together in the summing circuit 212 to produce a combined signal of interest.

Figure 10:
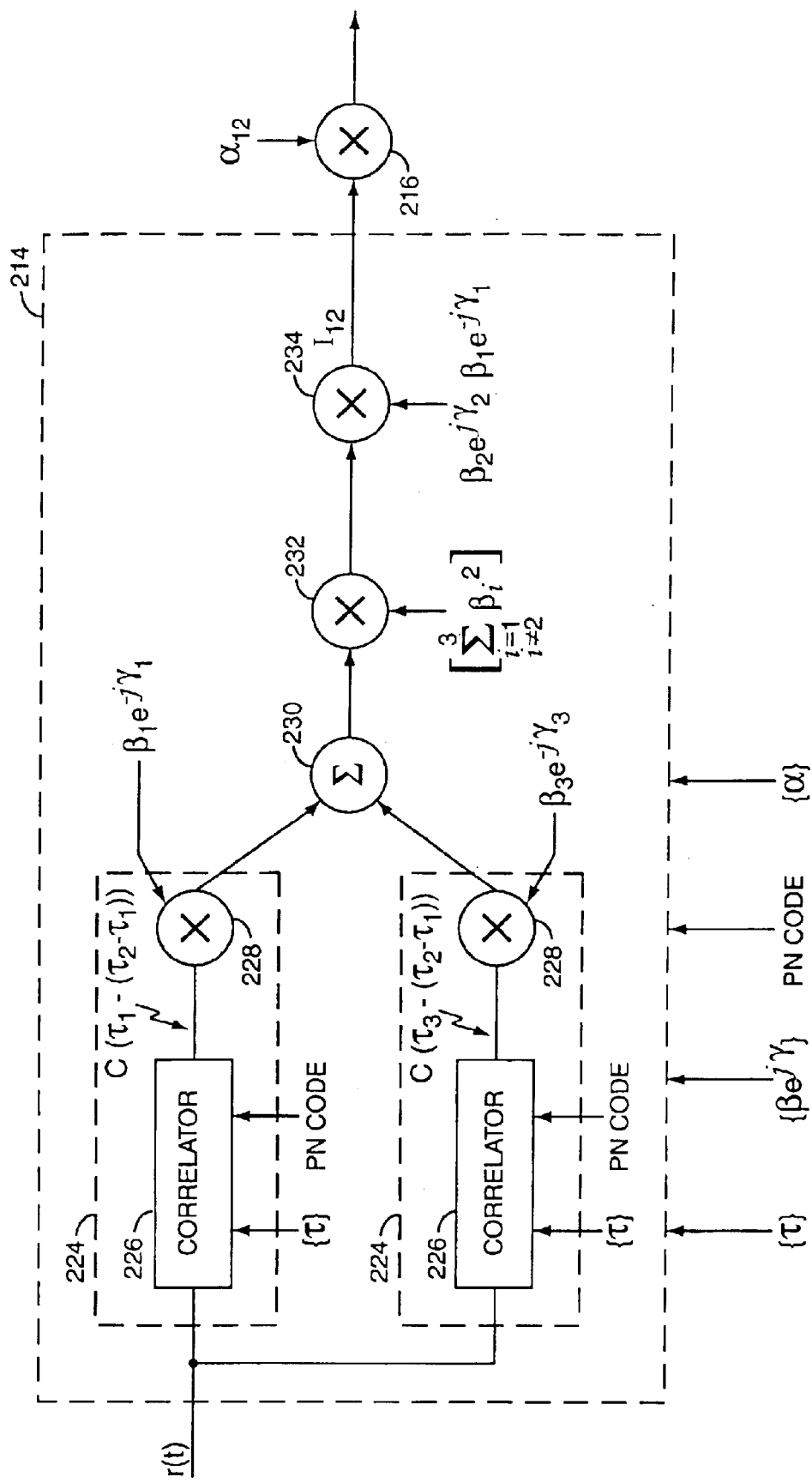
FIG. 10 is a functional diagram illustrating exemplary details of a secondary RAKE finger used in interference estimation provided by the modified RAKE receiver of FIG. 5, when the number of channel paths L=3.

FIG. 10 provides details for a selected one of the interference estimators 214 included in the interference estimation RAKE 204. The interference estimator 214 includes secondary fingers 224, a summing circuit 230, and multipliers 232 and 234. The secondary fingers 224 each include a correlator 226 and a multiplier 228. As illustrated, the interference estimator 214 is configured to estimate multipath interference arising from propagation path 2 in the signal of interest recovered by the primary RAKE finger 210 that is aligned with propagation path 1. Thus, the illustration continues the three-path example. As noted, each interference estimator 214 nominally includes L–1 secondary RAKE fingers 224. In this context, first and second propagation path references do not necessarily imply a first and second delay relationship between the first and second propagation paths, rather the terms are used for convenient reference. In the illustrated example, the multipath interference arising from path 2 is determined using correlation time offsets relative to paths 1 and 3.

The upper secondary RAKE finger 224 is configured to correlate the received CDMA signal a time offset determined based on a difference between path delays corresponding to the first and second propagation paths. Referring back to FIG. 8, the upper secondary RAKE finger 224 is configured to correlate the received CDMA signal at a time offset determined as $\tau_1 - (\tau_2 - \tau_1)$, which is equivalent to correlating the received CDMA signal over a correlation window that is shifted backwards from time $\tau 1$ by an amount equal to the arrival time offset between propagation paths 1 and 2. This arrival time difference may be measured as the difference between $\tau 1$ and $\tau 2$.

Similarly, the lower secondary RAKE finger 224 is configured to correlate the received CDMA signal at time offset determined based on a difference between path delays corresponding to the first, second, and third propagation paths. Specifically, the correlator 226 in the lower secondary RAKE finger 224 is configured to correlate the received CDMA signal at time offset given by $\tau_3 - (\tau_2 - \tau_1)$, which is equivalent to correlating the received CDMA signal over a correlation window that is shifted backwards from time $\tau_3$ by an amount equal to the propagation path delay difference between propagation paths 2 and 1. This difference is expressed as $\tau_2 - \tau_1$.

The upper secondary RAKE finger 224 is configured to multiply its correlation result with a channel gain that is the complex conjugate of the channel gain applied by the primary RAKE finger aligned with propagation path 1. Similarly, the lower secondary RAKE finger 224 is configured to multiply its correlation result by the complex conjugate of the channel gain applied by the primary RAKE finger aligned with propagation path 3. Multiplication of the correlation results output from the secondary RAKE fingers 224 allows the interference estimates to be coherently combined by summing circuit 230.

Thus, the interference estimate output by the upper secondary RAKE finger 224 may be expressed as the correlation result $C(\tau_1-(\tau_2-\tau_1))$ multiplied by the complex conjugate of the path 1 channel coefficient, $\beta_1 e^{j\gamma}{}_1$. Similarly the interference estimate output by the lower secondary RAKE finger 224 may be expressed as the correlation result $C(\tau_3-(\tau_2-\tau_1))$ multiplied by the complex conjugate of the path 1 channel coefficient, $\beta_1 e^{-j\gamma}{}_1$. These two interference estimates must be added to produce a combined interference estimate for path 1 with respect to path 2. Using maximum ratio combining, the two interference estimates may be coherently combined to form $I_{1,2}$ as, $$I_{1,2} = \left[\frac{C(\tau_1 - (\tau_2 - \tau_1))\beta_1 e^{-j\gamma_1} + C(\tau_3 - \tau_2 - \tau_1))\beta_3 e^{-j\gamma_3}}{\beta_1^2 + \beta_3^2}\right]\beta_2 e^{j\gamma_2}\beta_1 e^{-j\gamma_1}$$

The above equation may be generalized for $I_{f,l}$, which represents the interference on the primary RAKE finger 210 aligned with propagation path f arising from propagation path I, as, $$I_{f,l}\left[\frac{\sum_{m=1}^{L} C(\tau_m - (\tau_l - \tau_f))\beta_m e^{-j\gamma_m}}{\sum_{m=1}^{L} \beta_m^2}\right]\beta_l e^{j\gamma_l}\beta_f e^{-j\gamma_f}, m \neq l.$$

The combined multipath interference estimate output from the summing circuit 230 is multiplied by the inverse sum of the signal powers for all propagation paths but the one for which the interference estimate is being developed. Thus, in the illustrated example, interference estimates are being developed for propagation path 2, so the signal powers for paths 1 and 3 are summed and inverted and then used to multiply the combined interference estimate in multiplier 232. This action creates a unity-power multipath interference estimate signal. The unity-power multipath interference estimate signal must then be scaled in accordance with the channel coefficients for the propagation paths involved. Here, the estimate for the interference in the propagation path 1 signal arising from the propagation path 2 signal is being developed, so the channel coefficient corresponding to paths 1 and 2 are used. Thus, multiplier 234 multiplies the unity-power multipath interference estimate signal by $\beta_2 e^{j\gamma_2} * \beta_1 e^{-j\gamma_1}$.

This action generates the estimated multipath interference signal, $I_{1,2}$ where $I_{1,2}$ denotes the interference in the signal of interest produced by the primary RAKE finger 210 aligned to path 1 arising from path 2. In general, the interference estimation RAKE 204 generates L(L−1) multipath interference signals, generically denoted as $I_{f,l}$ where f=1...L, l=1...L, and f≠l. This expression represents the interference estimate arising from the I propagation path for the signal of interest recovered from the primary RAKE finger 210 aligned with propagation path f.

The remaining interference estimators have similar structures that are configured with path delay and channel coefficient values that are in accordance with their respective primary RAKE fingers. The individual multipath interference outputs $I_{f,l}$ from all of the interference estimators 214 pass through individual multipliers 216 which effect a desired scaling prior to subtracting the interference estimates from the combined output of the primary RAKE 202.

The interference estimation technique employed by the interference estimation RAKE 204, could, absent proper care, result in adding additional interference to the combined output of the primary RAKE 202. This possibility principally arises from the correlation window shifting employed by the individual interference estimators 214. Because the correlation window shifts used in the interference estimators 214 are not necessarily time aligned to symbol boundaries in the received CDMA signal, correlation results include correlations across symbols, which may result in additional interference. Thus, the interference estimation RAKE 204 employs one of several techniques to arrive at a set of scaling factors that ensure the scaled versions of the multipath interference estimates $I_{f,l}$ produced by the interference estimators 214 accomplish the desired function of reducing, or at least not adding interference to the combined output signal from the primary RAKE 202.

One technique for accomplishing the above goal is to select the α's based on maximizing the overall signal to noise plus interference ratio (SNIR) in the combined signal of interest output by the primary RAKE 202 after subtraction of the combined interference estimate output by the interference estimation RAKE 204. Alternately, the SNIR for individual primary RAKE fingers 210 may be maximized. A simpler technique for accomplishing this is to set each $\alpha_{f,l}$ (the scaling applied to $I_{f,l}$) as a ratio of the interference power and the sum of the interference power and non-interference power for each primary RAKE finger with respect to the propagation path to which the particular interference estimator 214 is concerned with. Thus, $\alpha_{f,l}$, which is the scaling factor to be applied to $I_{f,l}$, may be determined as, $$\alpha_{f,l} = \frac{P_x}{P_x + P_y}$$

Where a first component of $I_{f,l}$ is x, where x is the interference that is desired to be subtracted from the primary RAKE finger 210 aligned with propagation path f caused by propagation path I. Component x has a signal power expressed as $P_x$. A second component y denotes residual terms in $I_{f,l}$ that are not interference terms in the primary RAKE finger 210 aligned with propagation path f. Component y has a signal power expressed as $P_y$. The subtraction of $I_{f,l}$ removes the interference term x from the signal of interest output by the respective primary RAKE finger 210 aligned with f. However, this subtraction adds the residual component y, which was not part of the original interference. Selecting $\alpha_{f,l}$ in accordance with the above equation, insures that the subtraction process adds less interference power than it subtracts.

The present invention may, of course, be carried out in other specific ways than those herein set forth without departing from the spirit and essential characteristics of the invention.

The present embodiments are, therefore, to be considered in all respects as illustrative and not restrictive, and all changes coming within the meaning and equivalency range of the appended claims are intended to be embraced therein.

What is claimed is:

1. A method of reducing multipath interference in a received composite signal comprising a plurality of multipath signals, the method comprising:
   correlating the received composite signal with a PN code sequence at a time offset corresponding to a first one of the plurality of propagation paths to recover a signal of interest from a first multipath signal;
   multiplying the signal of interest by a first channel coefficient determined for the first one of the plurality of propagation paths to adjust a gain and phase of the signal of interest;

correlating the received composite signal with the PN code sequence at a time offset corresponding to a delay difference between the first multipath signal and a second multipath signal to generate a multipath interference estimate;

multiplying the multipath interference estimate by the first channel coefficient and by a second channel coefficient determined for the second one of the plurality of propagation paths to adjust a gain and phase of the multipath interference estimate; and subtracting the multipath interference estimate from the signal of interest to reduce multipath interference.

2. A method of reducing multipath interference in a received composite signal comprising a plurality of multipath signals, the method comprising:

correlating the received composite signal with a PN code sequence at a time offset corresponding to a first one of the plurality of propagation paths to recover a signal of interest from a first multipath signal;

correlating the received composite signal with the PN code sequence at a time offset corresponding to a delay difference between the first multipath signal and a second multipath signal to generate a multipath interference estimate;

multiplying the multipath interference estimate by an interference scaling factor determined by a ratio of multipath interference power in the signal of interest arising from the second multipath signal and residual interference power in the multipath interference estimate introduced during determination of the multipath interference estimate; and subtracting the scaled multipath interference estimate from the signal of interest to reduce multipath interference.

3. A method of reducing multipath interference in a received composite signal comprising a plurality of multipath signals, the method comprising:

correlating the received composite signal with a PN code sequence at relative time offsets corresponding to path delays associated with selected ones of the plurality of multipath signals to recover a signal of interest from each one of the selected multipath signals;

determining multipath interference estimates for each one of the selected multipath signals caused by remaining ones of the selected multipath signals by correlating the received composite signal at time offsets corresponding to path delay differences between the multipath signals wherein determining multipath interference estimates for a first one of the selected multipath signals caused by a second one of the selected multipath signals, comprises:

(a) for all but the second multipath signal, generating a correlation output by correlating the received composite signal with the PN code sequence at a time offset corresponding to a current one of the selected multipath signals offset by a delay difference between the first and second ones of the selected multipath signals;

(b) compensating each correlation output using channel coefficients determined for the current one of the selected multipath signals;

(c) coherently combining each correlation output to form a raw estimate of the interference in the first multipath signal caused by the second multipath signal;

(d) multiplying the raw estimate by a power-scaling factor to adjust a power of the raw estimate; and (e) multiplying the raw estimate by a channel-scaling factor to scale the raw estimate with respect to the first and second multipath signals to form the interference estimate for multipath interference in the first channel with respect to the second channel; and subtracting the multipath interference estimates determined for the selected ones of the multipath signals from the signals of interest recovered from the selected ones of the multipath signals.

4. The method of claim 3 further comprising:

scaling each of the multipath interference estimates by a respective one in a set of multipath interference estimate scalars;

combining the multipath interference estimates after scaling by the set of multipath interference estimate scalars to form a combined multipath interference estimate;

combining the signals of interest to form a combined signal of interest; and subtracting the combined multipath interference estimate from the combined signal of interest.

5. The method of claim 4 further comprising:

observing a characteristic dependent upon the signals of interest; and setting values of the set of multipath interference estimate scalars based on the characteristic so as to minimize overall multipath interference in the combined signal of interest.

6. The method of claim 5 further comprising:

monitoring the combined signal of interest after subtraction of the combined multipath interference estimate; and setting values of the set of multipath interference estimate scalars based on monitoring the combined signal of interest to minimize a remaining amount of multipath interference in the combined signal of interest after subtraction of the combined multipath interference estimate.

7. The method of claim 6, wherein adjusting values of the set of multipath interference estimate scalars based on monitoring the combined signal of interest to minimize a remaining amount of multipath interference in the combined signal of interest after subtraction of the combined multipath interference estimate comprises:

determining a multipath interference power value and a residual interference power value for each interference estimate scalar in the set of multipath interference estimates relevant to corresponding ones of the multipath interference estimates; and setting a value of each multipath interference estimate scalar based on a ratio involving the respective multipath interference power value and residual interference power value;

wherein the ratio involving the multipath interference power value and residual interference power value is adjusted to insure that the residual interference power value is always less than the multipath interference power value.

8. The method of claim 4 wherein combining the signals of interest to from a combined signal of interest comprises:

coherently combining the signals of interest to from a combined signal of interest.

9. A RAKE receiver comprising:

at least one primary RAKE finger, each adapted to recover a signal of interest from a selected multipath signal within a received composite signal comprising a plurality of multipath signals by correlating the received composite signal with a PN code at a time offset corresponding to the selected multipath signal;

at least one multipath interference estimator, each adapted to generate a multipath interference estimate for a corresponding one of the at least one primary RAKE finger caused by a remaining one of the plurality of multipath signals with respect to the selected multipath signal from which the corresponding primary RAKE finger recovers the signal of interest, each said multipath interference estimator comprising, (a) a plurality of secondary RAKE fingers, each adapted to generate an individual estimate of multipath interference in a first one of the plurality of multipath signals arising from a second one of the plurality of multipath signals by correlating the received composite signal with the PN code sequence at time offset corresponding to a selected one of the plurality of multipath signals shifted by a relative delay difference between the first and second multipath signals, wherein the selected multipath signal is not the second multipath signal;

(b) a first multiplier in each secondary RAKE finger adapted to multiply the individual estimate of multipath interference by a channel coefficient determined for the selected multipath signal on which the secondary RAKE finger operates;

(c) a combining circuit for combining the output from each secondary RAKE finger within the multipath interference estimator to form a raw multipath interference estimate;

(d) a second multiplier adapted to multiply the raw multipath interference estimate by a power-scaling value to form a power-scaled raw multipath interference estimate;

(e) a third multiplier adapted to multiply the power-scaled raw multipath interference estimate by a channel-scaling value to form the multipath interference estimate output by the multipath interference estimator; and a subtraction circuit for subtracting the multipath interference estimates generated by the at least one multipath interference estimator from the signals of interest recovered by the at least one primary RAKE finger.

10. The RAKE receiver of claim 9, wherein there are L primary RAKE fingers corresponding to L selected multipath signals, and up to (L−1) multipath interference estimators for each one of the L primary RAKE fingers, each of the up to (L−1) multipath interference estimators corresponding to a given one of the L primary RAKE fingers adapted to estimate the interference in the selected multipath signal corresponding to the given primary RAKE finger arising from a remaining one of the L selected multipath signals.

11. The RAKE receiver of claim 9 wherein the RAKE receiver is further adapted to determine the power-scaling value used in each of the at least one multipath interference estimators based on propagation channel coefficients determined for relevant ones of the plurality of multipath signals.

12. The RAKE receiver of claim 9 wherein the RAKE receiver is further adapted to determine the channel scaling value used in each of the at least one multipath interference estimators based on propagation channel coefficients determined for the first and second multipath signals relevant to a given one of the at least one multipath interference estimator.

13. The RAKE receiver of claim 9 further comprising a set of multipath interference-scaling multipliers, wherein individual ones of the multipath interference-scaling multipliers correspond to respective ones of the multipath interference estimates, and wherein each multipath interference-scaling multiplier is adapted to multiply the respective multipath interference estimate with a particular multipath interference scale value before the multipath interference estimates are subtracted from the signals of interest.

14. A mobile terminal comprising:

a user interface adapted to allow a user to control the mobile terminal, and to input local speech signals for transmission and hear remote speech signals recovered from received signals;

a transmitter adapted to transmit the local speech signals to a base station via an RF transmit signal; and a receiver adapted to recover the remote speech signals from a received composite signal; said receiver comprising:

at least one primary RAKE finger, each adapted to recover a signal of interest from a selected multipath signal within a received composite signal comprising a plurality of multipath signals by correlating the received composite signal with a PN code at a time offset corresponding to the selected multipath signal;

at least one multipath interference estimator, each adapted to generate a multipath interference estimate for a corresponding one of the at least one primary RAKE finger caused by a remaining one of the plurality of multipath signals with respect to the selected multipath signal from which the corresponding primary RAKE finger recovers the signal of interest, each said multipath interference estimator comprising, (a) a plurality of secondary RAKE fingers, each adapted to generate an individual estimate of multipath interference in a first one of the plurality of multipath signals arising from a second one of the plurality of multipath signals by correlating the received composite signal with the PN code sequence at time offset corresponding to a selected one of the plurality of multipath signals shifted by a relative delay difference between the first and second multipath signals, wherein the selected multipath signal is not the second multipath signal;

(b) a first multiplier in each secondary RAKE finger adapted to multiply the individual estimate of multipath interference by a channel coefficient determined for the selected multipath signal on which the secondary RAKE finger operates;

(c) a combining circuit for combining the output from each secondary RAKE finger within the multipath interference estimator to form a raw multipath interference estimate;

(d) a second multiplier adapted to multiply the raw multipath interference estimate by a power-scaling value to form a power-scaled raw multipath interference estimate;

(e) a third multiplier adapted to multiply the power-scaled raw multipath interference estimate by a channel-scaling value to form the multipath interference estimate output by the multipath interference estimator; and a subtraction circuit for subtracting the multipath interference estimates generated by the at least one multipath interference estimator from the signals of interest recovered by the at least one primary RAKE finger.

15. The mobile terminal of claim 14 wherein there are L primary RAKE fingers corresponding to L selected multipath signals, and up to (L−1) multipath interference estimators for each one of the L primary RAKE fingers, each of the up to (L−1) multipath interference estimators corresponding to a given one of the L primary RAKE fingers adapted to estimate the interference in the selected multipath signal corresponding to the given primary RAKE finger arising from a remaining one of the L selected multipath signals.

16. The mobile terminal of claim 14 wherein the RAKE receiver is further adapted to determine the power-scaling value used in each of the at least one multipath interference estimators based on propagation channel coefficients determined for relevant ones of the plurality of multipath signals.

17. The mobile terminal of claim 14 wherein the RAKE receiver is further adapted to determine the channel scaling value used in each of the at least one multipath interference estimators based on propagation channel coefficients determined for the first and second multipath signals relevant to a given one of the at least one multipath interference estimator.

18. The mobile terminal of claim 14 further comprising a set of multipath interference-scaling multipliers, wherein individual ones of the multipath interference-scaling multipliers correspond to respective ones of the multipath interference estimates, and wherein each multipath interference-scaling multiplier is adapted to multiply the respective multipath interference estimate with a particular multipath interference scale value before the multipath interference estimates are subtracted from the signals of interest.

* * * * *